United States Patent
Jimenez

(10) Patent No.: US 9,611,924 B2
(45) Date of Patent: Apr. 4, 2017

(54) TURBINE SHELL INCLUDING RECESSES FOR RECIEVING TURBINE BLADE TABS

(71) Applicant: Schaeffler Technologies GmbH & Co. KG, Herzogenaurach (DE)

(72) Inventor: Alfredo Jimenez, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 334 days.

(21) Appl. No.: 14/536,335

(22) Filed: Nov. 7, 2014

(65) Prior Publication Data

US 2016/0131237 A1    May 12, 2016

(51) Int. Cl.
*F16H 41/28* (2006.01)
*F16H 45/02* (2006.01)

(52) U.S. Cl.
CPC ............ *F16H 41/28* (2013.01); *F16H 45/02* (2013.01); *F16H 2045/0205* (2013.01); *F16H 2045/0231* (2013.01); *F16H 2045/0278* (2013.01)

(58) Field of Classification Search
CPC ...... F16H 41/26; F16H 41/28; F16H 2041/285
See application file for complete search history.

(56) References Cited

U.S. PATENT DOCUMENTS 7,937,937 B2    5/2011    Wolf et al.

*Primary Examiner* — F. Daniel Lopez
(74) *Attorney, Agent, or Firm* — Davidson, Davidson & Kappel, LLC

(57) ABSTRACT

A turbine for a torque converter is provided. The turbine includes a turbine blade including a first turbine blade tab and a turbine shell including an inner surface for supporting the turbine blades and an outer surface opposite the inner surface. The turbine shell includes a first slot passing through the turbine shell from the inner surface to the outer surface and a first recess extending from the outer surface toward the inner surface adjacent to the first slot. The first turbine blade tab connects the turbine blade to the turbine shell by passing through the first slot and being bent into the first recess. A method of forming a turbine for a torque converter is also provided.

16 Claims, 4 Drawing Sheets

TURBINE SHELL INCLUDING RECESSES FOR RECIEVING TURBINE BLADE TABS

The present disclosure relates generally to torque converters and more specifically to turbine shells and turbine blades of torque converters.

BACKGROUND

U.S. Pat. No. 7,937,937 describes a method of connecting turbine blades to a turbine shell using turbine blade tabs.

SUMMARY OF THE INVENTION

A turbine for a torque converter is provided. The turbine includes a turbine blade including a first turbine blade tab and a turbine shell including an inner surface for supporting the turbine blades and an outer surface opposite the inner surface. The turbine shell includes a first slot passing through the turbine shell from the inner surface to the outer surface and a first recess extending from the outer surface toward the inner surface adjacent to the first slot. The first turbine blade tab connects the turbine blade to the turbine shell by passing through the first slot and being bent into the first recess.

A method of forming a turbine for a torque converter is also provided. The method includes forming a first slot and a first recess in a turbine shell and connecting a turbine blade to the turbine shell by passing a turbine blade tab of the turbine blade through the first slot and bending the turbine blade tab such that a section of the turbine blade tab is received in the recess.

BRIEF DESCRIPTION OF THE DRAWINGS

The present invention is described below by reference to the following drawings, in which.

DETAILED DESCRIPTION

The present disclosure provides a turbine shell stamped with individual blade tab pockets or recesses for receiving the bent tabs of turbine blades. The blade tab pockets may provide additional clearance that may be beneficial due to larger dampers.

Figure 1:
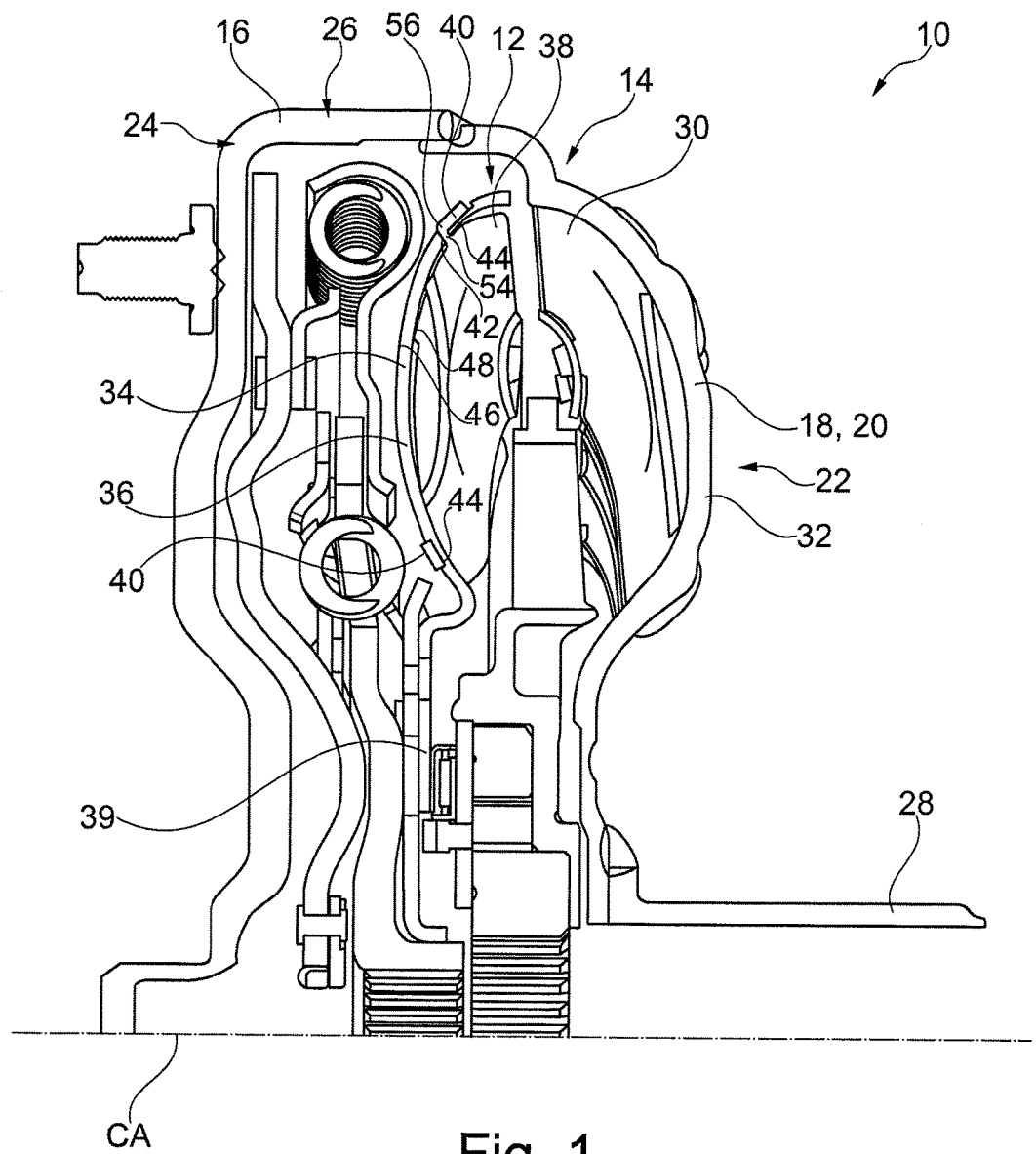
FIG. 1 shows a schematic cross-sectional side view of a torque converter including a turbine in accordance with an embodiment of the present invention.

FIG. 1 shows a schematic cross-sectional side view of a torque converter 10 including a turbine 12 in accordance with an embodiment of the present invention. Torque converter 10 is rotatable about a center axis CA and includes a cover 14 including a front cover 16 and a rear cover 18, which is formed by an impeller shell 20 of an impeller 22. Cover 14 houses a lockup clutch 24 and a damper 26, which are both schematically shown. Lockup clutch 24 engages with and disengages from front cover 16 and damper 26 couples turbine 12 to lockup clutch 24 such that turbine 12 is circumferentially driven with front cover 16 when lockup clutch 24 is engaged with front cover 16. Impeller 22 further includes an impeller hub 28 fixed to impeller shell 20 and impeller blades 30 supported by a rounded portion 32 of impeller shell 20.

Turbine 12 includes a turbine shell 34 including a rounded blade support portion 36 supporting turbine blades 38. Radially inside of rounded blade support portion 36, turbine shell 34 includes an inner radial extension 39 for connecting to damper 26. Turbine blades 38 are connected to turbine shell 34 via blade tabs 40 that are inserted in slots 42 passing through turbine shell 34 and bent to engage recesses 44 formed in an outer surface 46 of turbine shell 34 facing away from turbine blades 38. Recesses 44 extend into surface 46 without passing completely through turbine shell to an inner surface 48, which is opposite of surface 46 and supports blades 38. In a preferred embodiment, after blades 38 are connected to turbine shell 34 by tabs 40, blades 38 are brazed to turbine shell 34. The brazing may be accomplished as described in U.S. Pat. No. 7,918,645.

Figure 2A:
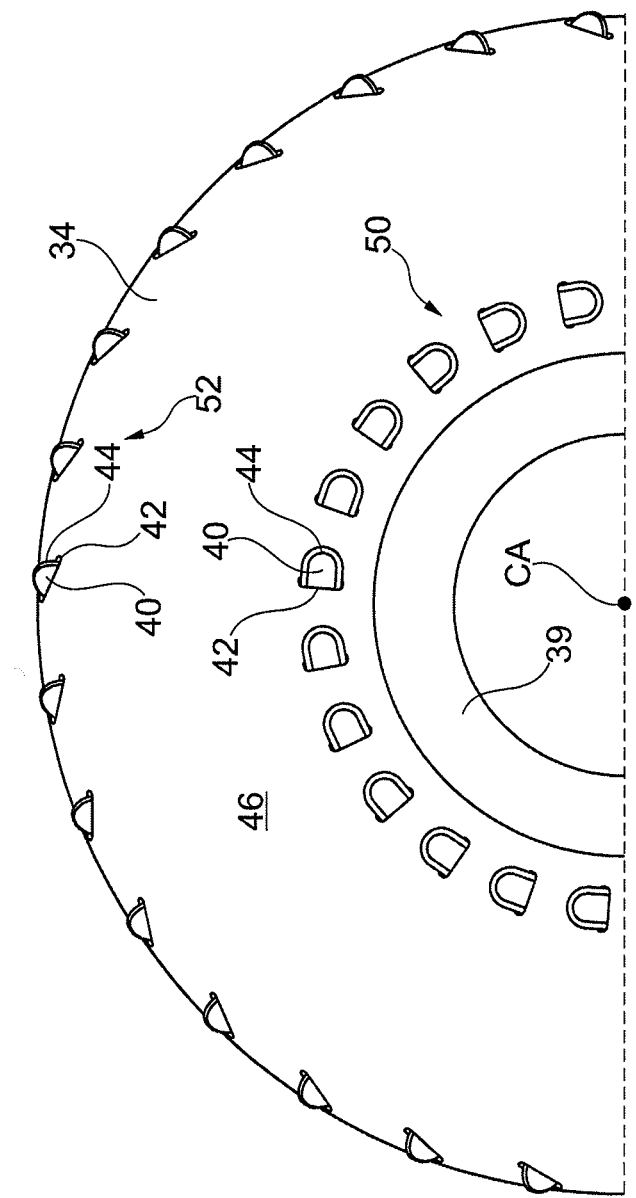
FIG. 2a schematically shows a half plan view of bent turbine blade tabs passing through slots in a turbine shell of the turbine shown in FIG. 1 and being received in recesses formed in an outer surface of the turbine shell.
Figure 2B:
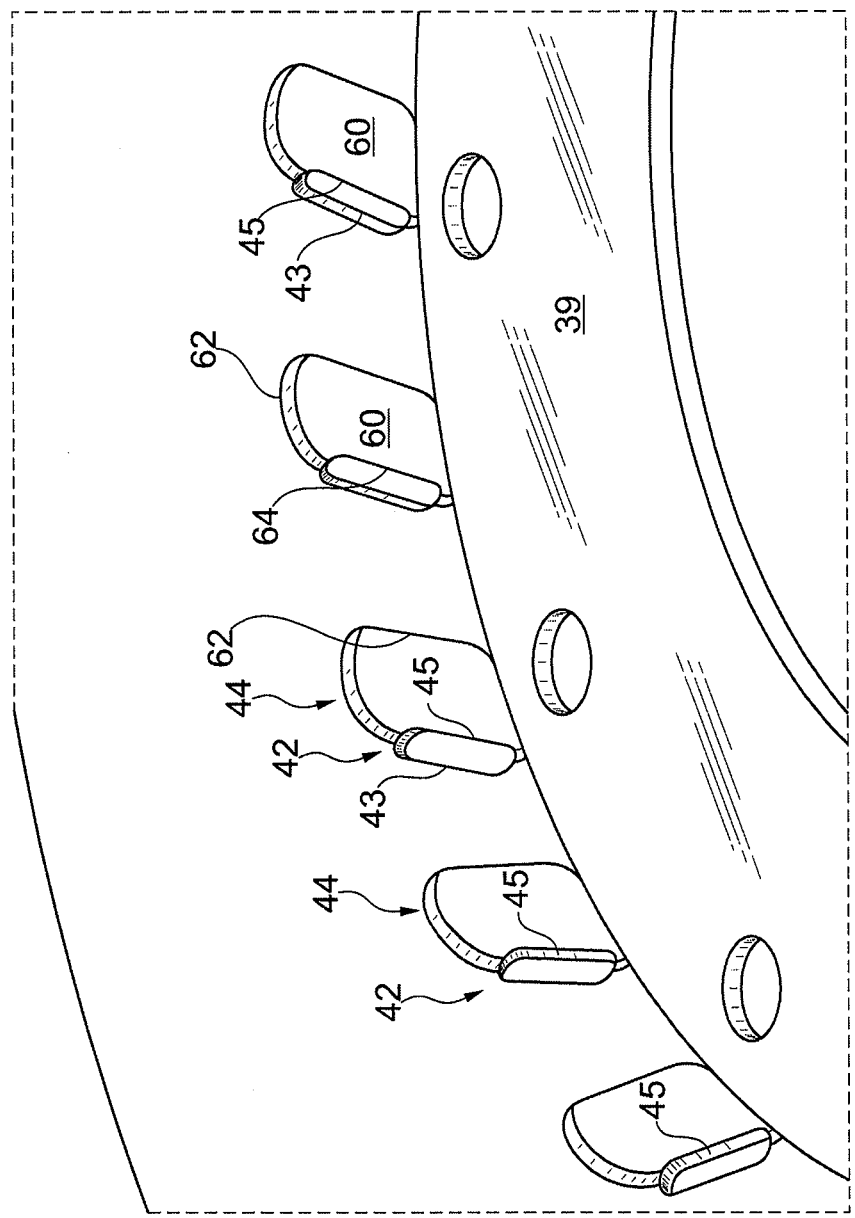
FIG. 2b shows a perspective view of the slots and recesses formed in the outer surface of turbine shell before blades tabs are inserted therein.
Figure 2C:
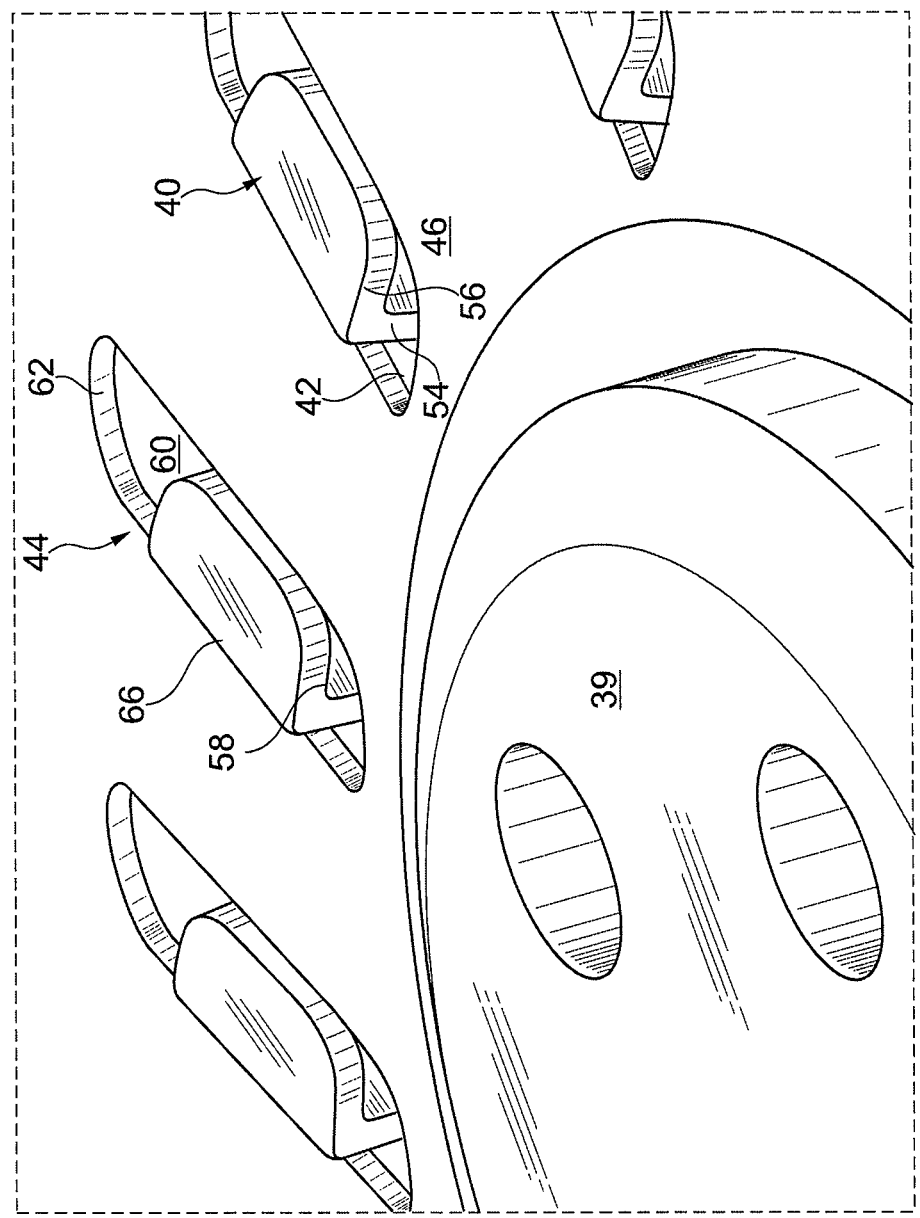
FIG. 2c shows a perspective view of the bent turbine blade tabs passing through slots and being received in the recesses formed in the outer surface of the turbine shell.

FIGS. 2a to 2c show views of outer surface 46 of turbine shell 34. FIG. 2a schematically shows a half plan view of bent turbine blade tabs 40 passing through slots 42 and being received in recesses 44 formed in outer surface 46 of turbine shell 34. FIG. 2b shows a perspective view of slots 42 and recesses 44 formed in outer surface 46 of turbine shell 34 before blades tabs 40 are inserted therein. FIG. 2c shows a perspective view of bent turbine blade tabs 40 passing through slots 42 and being received in recesses 44 formed in outer surface 46 of turbine shell 34. As shown in FIGS. 2a to 2c, each bent tab 40 passes through one slot 42 and is received in one recess 44. In the embodiment shown in FIGS. 2a to 2c, recesses 44 each have a depth that is less than a thickness of blade tabs 40, allowing a savings in the axial space in the envelope of torque converter 10, but without thinning turbine shell 34 to a degree that affects the durability of turbine shell 34. In other embodiments, recesses 44 may each have a depth that is greater than or equal to a thickness of blade tabs 40, allowing a greater savings in the axial space in the envelope in torque converter 10.

As shown in the embodiment in FIG. 2a, slots 42 and recesses 44 are provided in turbine shell 34 in two rows 50, 52. A radially inner row 50 of slots 42 and recesses 44 extend in a repeating pattern circumferentially about center axis CA at a first same radial distance from center axis. In this embodiment, in inner row 50, slots 42 are formed to extend substantially radially and recesses 44 each extend from the respective slot 42 circumferentially in a direction that is perpendicular to slots 4. A radially outer row 52 of slots 42 and recesses 44 extend in a repeating pattern circumferentially about center axis CA at a second same radial distance from center axis that is greater than the first radial distance. In this embodiment, in outer row 52, slots 42 are formed to extend substantially circumferentially and radially and recesses 44 each extend from the respective slot 42 circumferentially and radially in a direction that is perpendicular to slots 42.

Each turbine blade 38 includes one radially inner turbine blade tab 40 for passing through one slot 42 from radially inner row 50 and being received in one recess 44 from radially inner row 50 and one radially outer turbine blade tab 40, which is radially offset from the radially inner turbine blade tab 40, for passing through one slot 42 from radially outer row 52 and being received in one recess 44 from radially outer row 52.

Bent tabs 40 each includes a first section 54 that extends through slot 42 and is angled traverse to the plane of the surrounding outer surface 46 and a second section 56 that is angled with respect to first section 54 extends approximately parallel to the plane of the surrounding outer surface 46. Second section 56 is angled such that an inner surface 58 thereof contacts a base surface 60 of recess 44. Recess 44 is formed such that base surface 60 extends substantially parallel to the plane of the surrounding outer surface 46. At the perimeter of base surface 60, base surface 60 is delimited by walls 62 and by an edge 64 of slot 42. Walls 62 extend traverse to base surface 60, at a substantially perpendicular angle, into outer surface 46. Walls 62 and base surface 60 are thus configured with respect to outer surface 46 to form a step into turbine shell 34. Edge 64 of slots 42 contacts first section 54 of bent tab 40. As discussed above, in this embodiment second section 56 is thicker that a depth of recesses 44, which is defined by a height of walls 62, such that an outer surface 66 of second section 56 is positioned above outer surface 46 of turbine shell 34.

Slots 42 may each have a cross-sectional shape of an elongated circle delimited by a first wall section 43 and a second wall section 45. First wall section 43 forms approximately half of slot 42 and extends from inner surface 48 to outer surface 46. Second wall section 45 forms approximately half of slot 42 and extends from inner surface 48 to base surface 60 of recess 44. Accordingly, first wall section 43 is of a greater height than second wall section 45. At base surface 60, wall section 45 defines edge 64 of slot 42.

A method for assembling turbine 12 may first include forming slots 42 and recesses 44 in turbine shell 34. Slots 42 and recesses 44 may be formed consecutively in turbine shell 34 or may formed simultaneously in turbine shell 34. In a preferred embodiment, recesses 44 may be formed by stamping outer surface 46 of turbine shell 34 to form base surface 60 and walls 62, and slots 42 may be formed by cutting or punching turbine shell 34 such that slots 42 extend though turbine shell 34 from outer surface 46 to inner surface 48. After slots 42 and recesses 44 are formed in turbine shell 34, turbine blades 38 may be connected to turbine shell 34 by passing blade tabs 40 though slots 42 and bending blade tabs 40 such that inner surface 58 of second section 56 of each blade tab 40 contacts the base surface 60 of the respective recess 44 and blade tabs 40 are bent over edges 64 of slots 42.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A turbine for a torque converter comprising:
a turbine blade including a first turbine blade tab;
a turbine shell including an inner surface for supporting the turbine blades and an outer surface opposite the inner surface, the turbine shell including a first slot passing through the turbine shell from the inner surface to the outer surface, the turbine shell including a first recess extending from the outer surface toward the inner surface adjacent to the first slot, the first turbine blade tab connecting the turbine blade to the turbine shell by passing through the first slot and being bent into the first recess.

2. The turbine as recited in claim 1 wherein the turbine blade includes a second turbine blade tab radially offset from the turbine blade tab, the turbine shell including a second slot radially offset from the first slot passing through the turbine shell from the inner surface to the outer surface, the turbine shell including a second recess extending from the outer surface toward the inner surface adjacent to the second slot, the second turbine blade tab connecting the turbine blade to the turbine shell by passing through the second slot and being bent into the second recess.

3. The turbine as recited in claim 1 further comprising a plurality of further turbine blades, each of the further turbine blades including a first further turbine blade tab, the turbine shell including a plurality of first further slots each passing through the turbine shell from the inner surface to the outer surface, the turbine shell including a plurality of first further recesses each extending from the outer surface toward the inner surface adjacent to a respective one of the first further slots, each of the first further turbine blade tabs connecting a respective one of the further turbine blades to the turbine shell by passing through a respective one of the first further slots and being bent into the respective adjacent first further recess.

4. The turbine as recited in claim 3 wherein each of the further turbine blades includes a second further turbine blade tab radially offset from the first further turbine blade tab, the turbine shell including a plurality of second further slots radially offset from the first further slots each passing through the turbine shell from the inner surface to the outer surface, the turbine shell including a plurality of second further recesses each extending from the outer surface toward the inner surface adjacent to a respective one of the second further slots, each of the second further turbine blade tabs connecting a respective one of the further turbine blades to the turbine shell by passing through a respective one of the second further slots and being bent into the respective adjacent second further recess.

5. The turbine as recited in claim 1 wherein the first recess is defined by a base surface and walls extending traverse to the base surface into the outer surface.

6. The turbine as recited in claim 5 wherein the base surface extends into an edge of the first slot.

7. The turbine as recited in claim 6 wherein the first slot is defined by a first wall section extending from the inner surface to the outer surface and a second wall section extending from the inner surface to the base surface of the first recess, the second wall section defining the edge of the slot.

8. The turbine as recited in claim 5 wherein the first turbine blade tab includes a first section extending through the first slot and a second section angled with respect to the first section, the second section contacting the base surface of the first recess.

9. A torque converter for a motor vehicle comprising:
the turbine as recited in claim 1; and
a damper, the first recess facing the damper.

10. A method of forming a turbine for a torque converter comprising:
forming a first slot and a first recess in a turbine shell; and
connecting a turbine blade to the turbine shell by passing a turbine blade tab of the turbine blade through the first slot and bending the turbine blade tab such that a section of the turbine blade tab is received in the recess.

11. The method as recited in claim 10 wherein the forming the first recess includes stamping an outer surface of the turbine shell.

12. The method as recited in claim 10 wherein the first recess is defined by a base surface and walls extending traverse to the base surface into the outer surface.

13. The method as recited in claim 12 wherein the connecting the turbine blade to the turbine shell includes contacting the base surface with a surface of the section of the turbine blade tab received in the recess.

14. The method as recited in claim 10 wherein the first slot is defined by a first wall section extending from the inner surface to the outer surface and a second wall section extending from the inner surface to the base surface of the first recess, the second wall section defining an edge of the slot abutting the base surface.

15. The method as recited in claim 14 wherein the bending the turbine blade tab includes bending the turbine blade tab over the edge of the slot.

16. The method as recited in claim 10 wherein the turbine shell includes a plurality of further slots and a plurality of further recesses, each further recess being adjacent to a respective one of the further slots, the method further comprising connecting a plurality of further turbine blades to the turbine shell by passing a further turbine blade tab of each of the further turbine blades through one of the further slots and bending the further turbine blade tabs such that a section of each further turbine blade tab is received in a respective one of the further recesses adjacent to the respective further slot.

* * * * *